3,220,761
CHAIN HOIST
Edmond E. Himel, Jr., 5900 Moss St., New Orleans, La.
Continuation of application Ser. No. 117,122, June 14, 1961, which is a division of application Ser. No. 741,295, June 11, 1958, now Patent No. 2,998,277, dated Aug. 29, 1961. Divided and this application Oct. 25, 1963, Ser. No. 319,927
5 Claims. (Cl. 294—81)

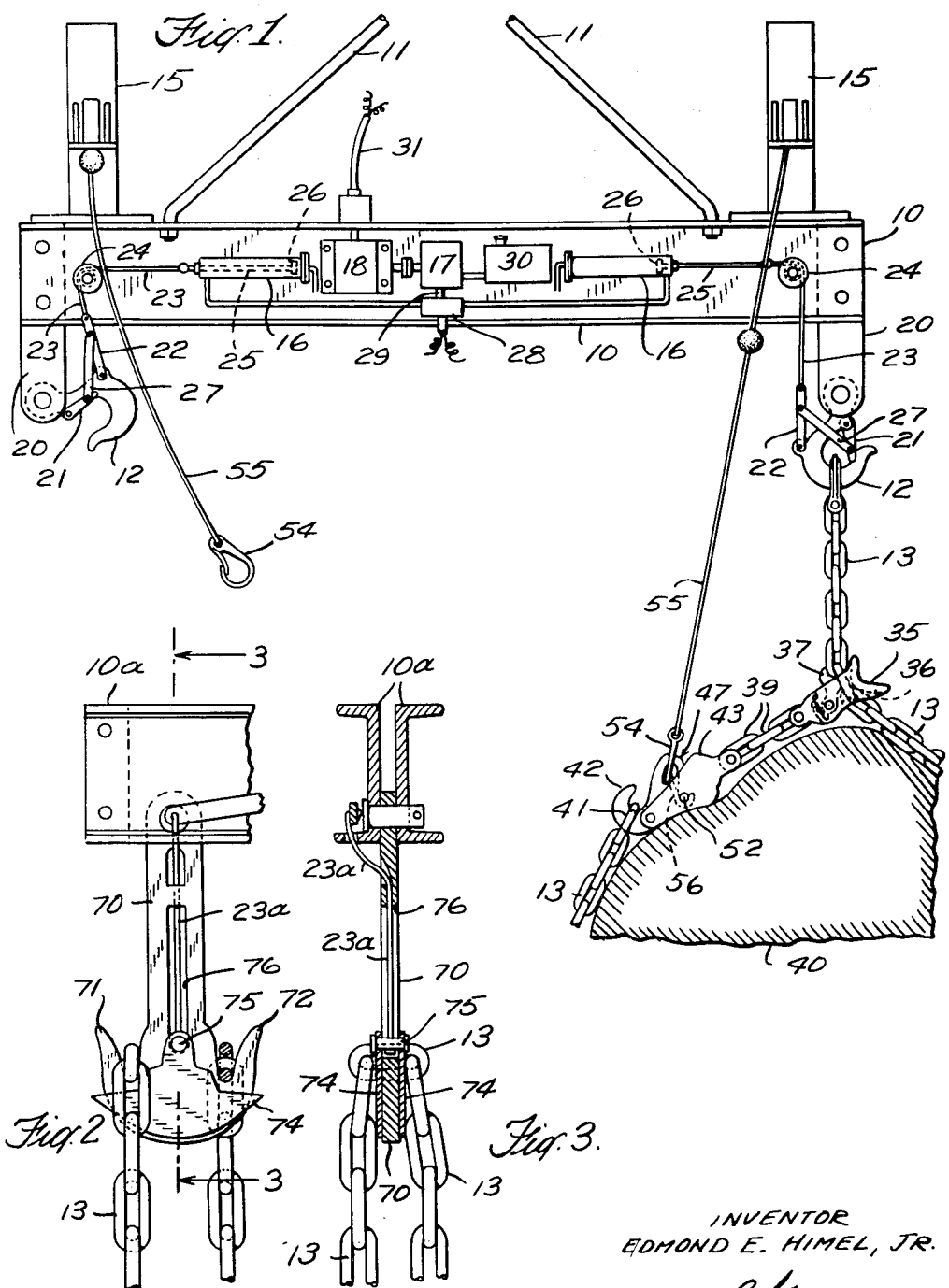

This application is a continuation of my copending application Serial No. 117,122 filed June 14, 1961, now abandoned, which in turn was a divisional application of my application Serial No. 741,295 filed June 11, 1958 on which application Patent No. 2,998,277 was issued on August 29, 1961.

This invention relates to chain hoists of the type used for handling sugar cane or the like and has for an object to provide a hoist of the above type having novel and improved characteristics.

Another object is to provide in a hoist of the above type novel and improved remotely controlled trip mechanism by which the operator of the hoist is adapted to drop the chain from the hoist after the load has been released from the chain.

Another object of the invention is to provide a safety trip constructed and arranged to prevent the accidental dropping of the chain from the hoist prior to the actuation of the chain release mechanism.

In accordance with the present invention one or more sling chains are attached to hooks depending from a spreader bar attached to a hoist. The hooks are provided with trip devices for dropping the chains from the spreader bar after the load has been released therefrom when desired. The trip device is connected to be actuated by a remote controlled fluid pressure device mounted on the spreader bar.

The specific nature of the invention will be better understood from the following description taken in connection with the accompanying drawing in which:

FIG. 1 is a side elevation of a hoisting apparatus embodying the invention;

FIG. 2 is a detail view of a further embodiment of the hook mechanism; and

FIG. 3 is a vertical section taken on the line 3—3 of FIG. 2.

Referring to the drawing the invention as shown therein embodies a spreader bar 10 which is connected to a hoist cable by rods 11 and carries a pair of sling chain hooks 12 from which sling chains 13 are suspended. The bar also carries fluid pressure cylinders 16 for actuating the chain release mechanism, a pump 17 for supplying fluid under pressure to the cylinders 16, and a motor 18 for actuating the pump 17 and a reservoir 30 for the pressure fluid.

Each hook 12 is pivoted to a bracket 20 attached to the spreader bar 10 and carries a latch 21 adapted to prevent the chain from accidentally falling from the hook.

A link 22 is pivoted to the hook 12 and is attached to a release line 23 which passes over a guide pulley 24 on the bar 10 and is connected to a piston rod 25 of a piston 26 sliding in the cylinder 16.

A link 27 is connected between the latch 21 and the link 22 to retract the latch 21 when the link 22 is actuated.

Normally a link or end ring of the chain 13 is carried by the hook 12 and is secured by the latch 21 as shown at the right in the drawing. When the chain is to be released, for example, after the load has been dropped, fluid under pressure is applied to the cylinder 16 to actuate the piston 26 for retracting the line 23, thereby pulling upwardly on the link 22 to pivot the hook 12 to the position shown at the left in the drawing. At the same time the latch 21 is retracted by the link 27 to release the chain 13 and allow it to drop from the retracted hook 12.

The fluid pressure to the cylinder 16 is controlled from the hoist operator's cabin or other remote point by an electrically controlled valve 28 in the pressure line 29 leading from the pump 17 to each cylinder 16. Pressure fluid for actuating the pistons is derived from the reservoir 30. A cable 31 supplies power to actuate the motor 18 and the remote controlled valve 28. Obviously the valve 28 may be omitted, in which event both hooks are tripped in unison when power is supplied to the motor 18.

The chain 13 passes through a guide 35 having a member 36 in the form of a fixed block or a rotatable sleeve over which the chain can slide and having a pawl 37 which is spring pressed into engagement with the member 36. The pawl 37 is adapted to be automatically retracted when the chain is pulled through the guide 35 in a direction to grip the load but to clamp the chain against return movement.

The chain after passing through the guide 35 passes around a load 40. The end ring 41 of the chain is hooked over a hook 42 which is pivoted to a frame 43. The frame 43 is connected to the guide 35 by links 39.

A latch 47 which is pivoted to the frame 42, as indicated at 52, is yieldingly pressed into engagement with the hook 42 for normally retaining it in load carrying position. A trip line 55 which is carried by a trip line reel 15, mounted on the bar 10, is connected to the latch 47 by a snap hook 54 secured to the outer end of the trip line 55. Whenever it is desired to drop the load 40, the trip line 55 is drawn into the reel 15 which withdraws the latch 47 from the hook 42 allowing the hook 42 to pivot and drop the end of the chain for releasing the load.

FIGS. 2 and 3 show a modified form of hook and chain release mechanism. As shown therein an arm 70 carrying double hooks 71 and 72 is pivoted to the end of a spreader bar 10ª, similar to the spreader bar 10 above described. The hooks 71 and 72 are adapted to engage links of hoisting chains 13 as in the case of hooks 12 described in connection with FIG. 1.

For releasing the chains from the hooks 71 and 72 cam plates 74 are provided carrying a pin 75 which is slidable vertically in a slot 76 in the arm 70. These cam plates 74 are attached to a trip line 23ª corresponding to the trip line 23 of FIG. 1 and connected to be actuated as above described.

This double hook is adapted to carry two hoisting chains which may pass around the same load or separate loads as desired. Both chains are automatically released when the operator desires to drop the chains.

Although certain specific embodiments of the invention have been shown and described for purposes of illustration, it is to be understood that the invention may be adapted for various uses and may be embodied in various forms as will be apparent to a person skilled in the art.

I claim:

1. A sling hoist with remote controlled trip, comprising a bar adapted to be suspended from a hoisting cable, a hook for receiving a sling chain pivotally supported by said bar and normally disposed in chain retaining position, a fluid pressure cylinder mounted on said bar, a piston reciprocally mounted in said cylinder, a trip line having one end thereof connected to said piston and the other end thereof connected directly to said hook, fluid pressure supply means mounted on said bar and operatively connected to said cylinder for supplying fluid under pressure to said cylinder, said cylinder being operative to actuate said trip line to pivot said hook to chain releasing position, and remote control means connected to said fluid pressure supply means by which said fluid pressure supply means is rendered operative to supply fluid under pressure to said cylinder.

2. A device as set forth in claim 1 in which a hook latch which is operative to prevent accidental removal of said chain from said hook is carried by said hook, and in which said trip line is also connected to retract said hook latch to inoperative position as said hook is pivoted to chain-releasing position.

3. A sling hoist comprising a bar adapted to be suspended from a hoisting cable, a hook which is adapted to be connected to one end of a sling chain, mounting means by which said hook is pivotally connected to said bar, said hook being normally disposed in chain-retaining position, and remotely controlled means mounted on said bar by which said hook is adapted to be rotated about said mounting means to chain-releasing position; said remotely controlled means comprising a cylinder having a piston reciprocally mounted therein, a fluid reservoir, conduit means between said cylinder and said reservoir, a pump which is interposed in said conduit means and is operative to force fluid under pressure from said reservoir into said cylinder, a remotely controlled electric motor by which said pump is adapted to be operated, a remotely controlled electrically actuated valve by which the flow of fluid into and out of said cylinder is controlled interposed in said conduit means between said pump and said cylinder, and a trip line having one end thereof connected to said piston and the other end thereof connected directly to said hook.

4. A sling hoist comprising a bar adapted to be suspended from a hoisting cable, a hook which is adapted to be connected to one end of a sling chain, mounting means by which said hook is pivotally connected to said bar, said hook being normally disposed in chain-retaining position, and remotely controlled means mounted on said bar by which said hook is adapted to be rotated about said mounting means to chain-releasing position; said remotely controlled means comprising a cylinder having a piston reciprocally mounted therein, a fluid reservoir, conduit means between said cylinder and said reservoir, a pump which is interposed in said conduit means and is operative to force fluid under pressure from said reservoir into said cylinder, a remotely controlled electric motor by which said pump is adapted to be operated, a remotely controlled electrically actuated valve by which the flow of fluid into and out of said cylinder is controlled interposed in said conduit means between said pump and said cylinder, and a trip line having one end thereof connected to said piston and the other end thereof connected to the free end of a first link which is pivotally connected to said hook, a latching link which is pivotally connected to said hook and which in normal position is operative to prevent accidental removal of a chain from said hook, a second link having one end thereof pivotally connected to said first link intermediate the ends thereof and the other end thereof pivotally connected to said latching link intermediate the ends thereof, whereby when said hook is rotated to chain-releasing position by said trip line said latching link is withdrawn to inoperative position.

5. A sling hoist comprising a bar adapted to be suspended from a hoisting cable, a hook which is adapted to be connected to one end of a sling chain, mounting means by which said hook is pivotally connected to said bar, said hook being normally disposed in chain-retaining position, and remotely controlled means by which said hook is adapted to be rotated about said mounting means to chain-releasing position; said remotely controlled means comprising a trip line having one end thereof connected to the free end of a first link which is pivotally connected to said hook, a latching link which is pivotally connected to said hook and which in normal position is operative to prevent accidental removal of a chain from said hook, a second link having one end thereof pivotally connected to said first link intermediate the ends thereof and the other end thereof pivotally connected to said latching link intermediate the ends thereof, whereby when said hook is rotated to chain-releasing position by said trip line said latching link is withdrawn to inoperative position.

References Cited by the Examiner
UNITED STATES PATENTS

| 2,412,845 | 12/1946 | Stevens | 294—88 |
| 2,822,207 | 2/1958 | Steinmetz | 294—83.1 |
| 2,863,312 | 12/1960 | Schenk | 294—83.1 |

FOREIGN PATENTS 1,104,012  11/1955  France.

GERALD M. FORLENZA, *Primary Examiner.*

ERNEST A. FALLER, SAMUEL F. COLEMAN,
*Examiners.*